United States Patent [19]

Morén et al.

[11] Patent Number: 4,489,262
[45] Date of Patent: Dec. 18, 1984

[54] DEVICE FOR CONTROLLING A RELUCTANCE MOTOR

[75] Inventors: Lars G. Morén, Huddinge; Ulf P. Berg, Hägersten; Bengt G. Hedlund, Stockholm, all of Sweden

[73] Assignee: Aktiebolaget Electrolux, Stockholm, Sweden

[21] Appl. No.: 533,406

[22] Filed: Sep. 19, 1983

[30] Foreign Application Priority Data

Oct. 1, 1982 [SE] Sweden ................................ 8205624

[51] Int. Cl.³ ............................................ H02K 29/00
[52] U.S. Cl. ..................................... 318/700; 318/701; 310/168
[58] Field of Search ................ 318/254, 138, 106, 700, 318/701, 721, 778, 430, 715–717; 310/46, 49 R, 162–164, 261, 269, 168

[56] References Cited

U.S. PATENT DOCUMENTS 3,679,953 7/1972 Bedford ............................... 318/701
3,956,678 5/1976 Byrne et al. ........................ 310/168

Primary Examiner—E. A. Goldberg
Assistant Examiner—A. Evans
Attorney, Agent, or Firm—Alfred E. Miller

[57] ABSTRACT

A two-pole reluctance motor comprises a stator having two diametrically opposed poles with windings, and a rotor of soft magnetic material having two correspondingly positioned poles, each rotor pole having a first portion with a peripheral extension which coincides with the corresponding extension of the respective stator pole, and an additional portion adjacent the first portion and having a pole surface situated closer to the shaft of the rotor than the first portion. A device is arranged during the starting process of the motor to drive the motor by current pulses of a magnitude which in areas of pole overlap saturates at least those portions of the stator and the rotor pole, respectively, closest to the pole surfaces.

13 Claims, 3 Drawing Figures

U.S. Patent  Dec. 18, 1984  4,489,262
Fig. 1.
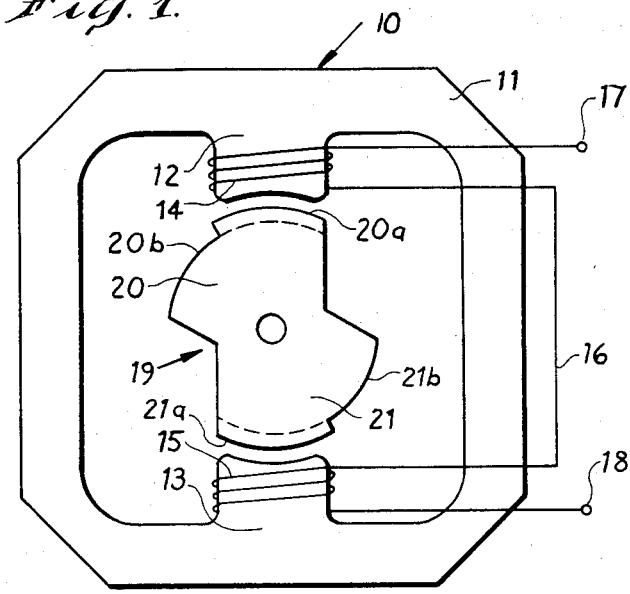
Fig. 3.
Fig. 2.
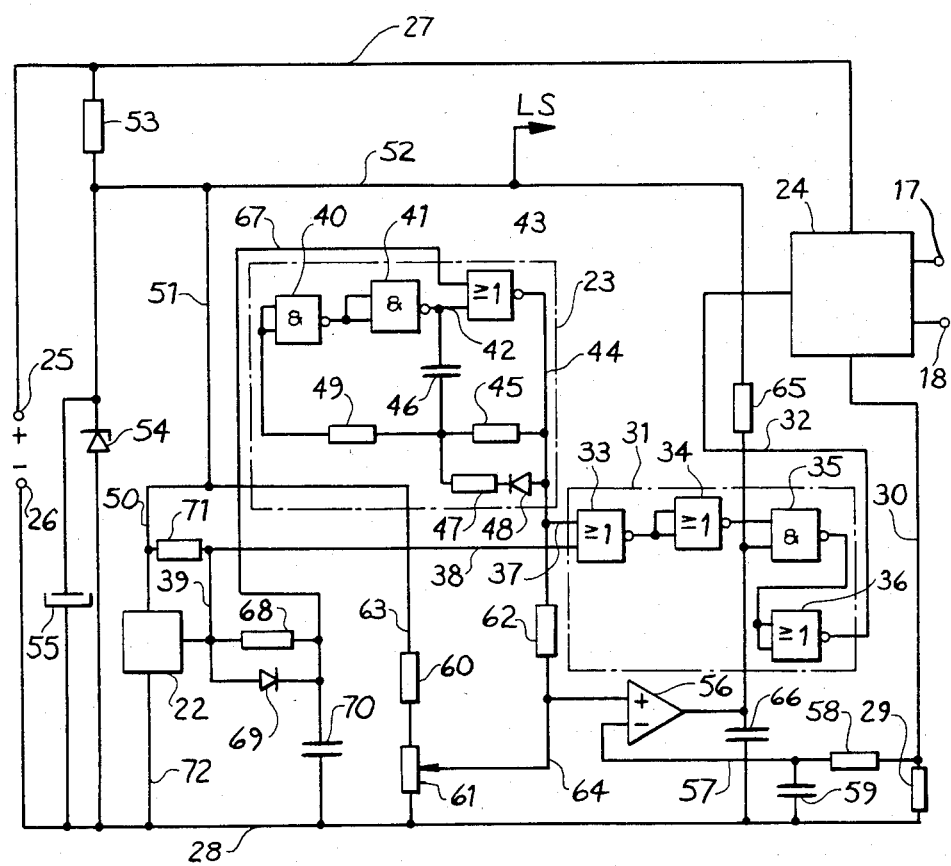

DEVICE FOR CONTROLLING A RELUCTANCE MOTOR

This invention relates to a device for controlling a reluctance motor.

A two-pole reluctance motor has four rotor positions per revolution in which it cannot supply any torque. These rotor positions are magnetic equilibrium positions of which two are unstable and the other two are stable. In the stable positions of equilibrium the rotor poles are situated opposite the stator poles. If the rotor on start is in an unstable position of equilibrium there will normally be no problem in getting the rotor start rotating. If, on the other hand, the rotor is in a stable position of equilibrium it cannot start without first having been moved out of the position of equilibrium.

The object of the invention is to provide a device for controlling a reluctance motor which device is designed so that the rotor in the event that on start it is in a stable magnetic position of equilibrium will automatically be moved out of a this position so that it can be caused to rotate in a predetermined direction during the starting process to follow. The object is achieved in a device having the characterizing features stated in the following claims.

The embodiment of the invention will now be described by way of example with reference to the accompanying drawings in which FIG. 1 diagrammatically illustrates a two-pole reluctance motor and FIG. 2 is a circuit diagram of a control device for the motor shown in FIG. 1.

FIG. 3 shows a modified part of the circuit diagram of FIG. 2.

FIG. 1 illustrates diagrammatically a two-pole reluctance motor generally denoted by 10. The motor includes a stator 11 comprising two equal poles 12, 13 situated diametrically opposite one another and having windings 14, 15, each having one end connected by means of a conductor 16 to one end of the other winding, the other ends being extended to form terminals 17, 18. The stator co-acts with a rotor 19 of soft magnetic material positioned in the air gap between the stator poles. The rotor has two opposite poles 20, 21 each one having a two-piece pole surface 20a, 20b and 21a, 21b, respectively. The shape and extension of the pole surfaces 20a and 21a is exactly adapted to the stator poles. The pole surfaces 20b and 21b are of the same shape as the pole surfaces 20a and 21a but are stepped radially inwardly to form a greater air gap to the stator poles than the latter ones. The peripheral extension of the pole surfaces 20b, 21b must exceed the size of the smallest air gap, i.e. the air gap between the stator pole surfaces and the pole surfaces 20a, 20b of the rotor. The peripheral extension in general is determined by the distance in which it is desired to have the rotor driven by the stator field. In the embodiment shown, the extension of the two pole surface portions 20a, b and 21a, b, respectively, is generally the same.

A position indicator 22, shown simply as a block in FIG. 2, is provided to obtain synchronization of the drive current pulses supplied to the motor windings with the turning position of the rotor. This indicator can for example be a wing connected to rotate with the rotor and coact with a Hall-sensor so that the Hall-sensor supplies voltage as long as the wing is in the sensor area. In the embodiment shown the indicator wing is so designed that the Hall-sensor supplies voltage when the rotor is in areas of positive torque with respect to a chosen direction of rotation.

In addition to a position indicator of the type described for starting a two-pole reluctance motor in the correct direction, a device is also required to check that the rotor will always stop in an area of positive torque, i.e. areas in which the rotor may be moved in the desired direction by the application of a pulse to the windings. A known solution to the problem is to provide a permanent magnet which turns the rotor to the desired position when the motor is deprived of current. This permanent magnet must be strong since the rotor may have to be turned through up to 90°. Such a positioning device with permanent magnet can be dispensed with in the device according to the invention in which the rotor can be allowed to stop in just any position. This has become possible in a motor having a rotor of the shape shown in FIG. 1 due to the fact that the areas close to the pole surfaces of the stator and the rotor poles are brought to saturation during the starting process. It has turned out that even if the rotor on start is in the position shown in FIG. 1, due to saturation phenomena it will turn to a new position of equilibrium which is determined by the peripheral extension of the two pole surfaces 20a and 20b taken together. From the new position of equilibrium it will always be possible by repeated current pulses to the motor windings 14, 15 to cause the motor to rotate. In the event the first current pulse should move the rotor to a position in an area of negative torque i.e., an arm in which the rotor is moved in a direction opposite the desired direction by the application of a pulse to the windings, the subsequent current pulse will cause it to turn in the opposite direction to a position in an area of positive torque. In the embodiment of FIG. 2 the indicator controls the supply of current pulses to the motor windings in areas of positive torque. In areas of negative torque and in areas without torque the current pulses supplied to the windings are controlled by a separate pulse generator denoted by 23.

In the alternative embodiment shown in FIG. 3 the indicator controls the motor during normal operation and simultaneously the pulse generator is kept inactive. On start, however, the position indicator signal is prevented from reaching the pulse generator during a predetermined period of time, and hence during this time the motor will be controlled entirely by the pulses supplied by the pulse generator.

A preferred embodiment will now be described in detail with reference to FIG. 2. Via terminals 17, 18 the motor windings 14, 15 are connected to an electronic switch 24, preferably comprised of transistors. The switch can be of any generally known construction and will not be described in detail. Voltage is supplied to the switch from a direct-current source represented by terminals 25, 26, the current source being connected to the terminal 25 via a conductor 27 and to the terminal 26 via a conductor 28. The conductor 28 is connected to the switch 24 via a resistor 29, whose function will be described below, and a conductor 30.

The electronic switch 24 is controlled by a logic circuit arrangement 31 to which it is connected via a conductor 32. The logic circuit arrangement includes four gates 33, 34, 35, 36 of which gates 34 and 36 have inverter function, gate 33 is a NOR-gate and gate 35 a NAND-gate. The circuit arrangement 31 is connected both to the pulse generator 23, via a conductor 37, and to the position indicator 22, via a conductor 38 and a conductor 39, respectively, the latter being connected to the output terminal of the position indicator.

The pulse generator 23 is of conventional construction and the embodiment shown is meant to be an example only. Two NAND-gates 40, 41 form together a buffer circuit whose output terminal via a conductor 42 is connected to an input terminal of NOR-gate 43, whose output terminal is connected to the conductor 37 via a conductor 44. The conductors 42 and 44 are also interconnected via a resistor 45 and a capacitor 46, and in parallel to the resistor an additional resistor 47 and a diode 48 are connected in series. The connecting point of the resistors 45 and 47 is connected to the input terminal of the gate 40 via a resistor 49.

Voltage to the position indicator 22 is supplied via conductors 50 and 51 from a conductor 52 to which a stabilized voltage is applied. This voltage originates from the direct-current source and passes a resistor 53 connected in series with a parallel connection comprising a zener diode 54 and a capacitor 55. The series circuit is connected between the conductors 27 and 28. Further, the position indicator is connected to the conductor 28 via a conductor 72. Also all the logic circuits included in the pulse generator 23 and in the logic circuit arrangement 31 are supplied from the conductor 52. This is illustrated by an arrow marked LS.

To avoid damage to the transistors included in the electronic switch 24 by the high currents or voltages which may appear during the starting process of the motor and before the motor has reached its operational speed a device is provided to delimit the current. This device comprises substantially a comparison circuit 56 in the form of an operational amplifier to the inverting input terminal, designated "−", of which a voltage is applied which is generated above the resistor 29 and represents the motor current. A conductor 57 connects the inverting input to a circuit in which the resistor 29 is connected in parallel to a combination of a resistor 58 in series with a capacitor 59 and in which the parallel connection is connected between the conductors 28 and 30. The conductor 57 is connected to the connecting point between the resistor 58 and the capacitor 59. The non-inverting input terminal, designated "+", of the comparison circuit 56 is connected to a reference voltage generated by a resistor net comprising three resistors 60, 61 and 62. Resistor 61 is variable for setting of the desired reference voltage. The resistors 60 and 61 are connected in series between the conductor 28 and a conductor 63, the latter via the conductor 51 being connected to the conductor 52. The resistor 62 is connected to the movable slide of the variable resistor 61 via a conductor 64 and further via the conductor 44 to the output terminal of the gate 43. This output terminal can be considered as a change-over switch which is connected either to the conductor 52 or to the conductor 28. During the periods of time in which a pulse is delivered by the pulse generator 23, the output terminal is thus connected to the conductor 52 and hence to positive voltage. During other periods of time the output terminal is connected to the conductor 28 having the reference voltage of O V. Thereby, during normal operation of the motor maintenance of a first current limitation level is achieved which protects the electronic switch in the event of failure. On the other hand, on start of the motor by the aid of pulses from the pulse generator a second current limitation level can be established admitting the currents required to saturate parts of the stator and the rotor, respectively. However, this elevated level will last only as long as the pulse generator delivers a pulse. The output terminal of the comparison circuit is connected to an input terminal of the Nand-gate 35 and further to the conductor 52 via a resistor 65 and to the conductor 28 via a capacitor 66.

The comparison circuit 56 is of the type having "Open-collector output", so that when the level at the output terminal is low the current flows into the said circuit. The components 65 and 66 are arranged so as to cause a delay in the feed-back loop between the comparison circuit 56 and the electronic switch 24. When the latter breaks the current the voltage across the resistor 29 will momentaneously drop allowing the circuit 56 to again cause the switch to close, which can give rise to self-oscillation phenomena. This is avoided by the fact the capacitor 66 when the level of the output terminal of the comparison circuit is low will discharge through this circuit and, when the circuit then again changes the conditions of the output terminal, has to be charged via the resistor 65 before the switch 24 can again be acted upon to close.

As stated above, the position indicator 22 controls the logic circuit arrangement 31 via the conductors 39, 38. The indicator is also arranged to control the mode of operation of the pulse generator 23 and it is for that purpose connected via a conductor 67 to an input terminal of the NOR-gate 43. The output terminal of the indicator 22 is connected to the conductor 67 via a parallel circuit comprising a resistor 68 and a diode 69. Via a capacitor 70 the conductor 67 is also connected to the conductor 28. The components 68, 69 and 70 form a delay circuit which via a resistor 71 is connected to the conductor 50 and hence via the conductor 51 to the conductor 52. The object of the delay circuit is to control that during normal operation of the motor the periodical inactivation of the position indicator does not cause activation of the pulse generator 23.

Alternatively, the control by the position indicator of the pulse generator 23 can be effected via a circuit of the type shown in FIG. 3. The components 68-70 are replaced by a circuit in which the output terminal of the indicator 22 is connected to the conductor 67 via a capacitor 73 and a diode 74. The conductor 67 is further connected to the conductor 28 via a resistor 75 and a capacitor 76 connected in parallel. The connecting point between the capacitor 73 and the diode 74 is further via a diode 77 connected to the conductor 28. Briefly, the function of the connection is such that several periods of position indicator signals are required to charge the capacitor 76, the capacitance of which is greater than that of the capacitor 73. The capacitor 76 must have reached a predetermined voltage level before the gate 43 can be acted upon to stop the pulse generator 23. This means that on start of the motor the pulse generator 23 will be connected during a period of time which is longer than in the embodiment according to FIG. 2. Thereby, in addition to the delaying effect discussed in the preceding paragraph, the advantage is obtained that the motor will receive strong starting pulses during a longer time, which is a good warrant for the motor to start. On the other hand the motor will be subject to strong pulls when the pulse generator uncontrolled is allowed to deliver control pulses to the motor. Thereby, the motor will be subject to strains, which are avoided by choosing the circuit solution shown in FIG. 2.

The circuit arrangement shown in FIG. 2 works in the following manner.

It is assumed that the motor is inoperative and that a direct voltage is established, in a manner not shown, between the terminals 25 and 26. If the position indicator 22 is in an area of positive motor torque the conductor 39 and hence the conductor 38 will assume a high level (equal to the voltage on the conductor 52) and this signal causes the logic circuit arrangement 31 to deliver a suitable signal on the conductor 32 to close the electronic switch 24 so that current starts flowing in the motor windings 14, 15. The rotor is thus acted upon to rotate in its normal direction of rotation and will turn under the influence of the magnetic field of the stator until it has left the area of positive torque, where the output terminal of the position indicator assumes a low level (equal to the potential on the conductor 20). When the position indicator signal assumed the high level the input terminal of the gate 43 was acted upon via the conductor 67 so that its output terminal assumed the low level, whereby the pulse generator 23 was blocked. Thereby also the level of the upper input terminal of the gate 33 assumed a low level. Now, when the indicator signal assumes a low level also the other input terminal of the circuit 33 will become low and the logic circuit arrangement 31 is acted upon so as to deliver a signal on the conductor 32 which opens the switch 24. If the initial current pulse was sufficiently strong the rotor will continue to turn also during the period when the current is broken and will again enter an area of positive torque causing a new current pulse to be delivered to the windings in the manner described. The motor will thus continue its rotation controlled by the indicator signals in a closed-loop operation. Exterior control is possible, for instance by changing the normal current limitation level by variation of the resistor 61. Another possibility of controlling the output and the speed of the motor is offered by electronic processing of the signal delivered by the position indicator 22 for varying the time at which the electronic switch is switched on respectively switched off.

If on start of the motor its rotor 19 should have assumed a position of negative torque the position indicator 22 will deliver a low-level signal on the conductor 39. If the capacitor 70 is discharged this signal will give a low level also on the conductor 67. Thereby the pulse generator 23 will be activated so that the conductor 44 and the input terminal of gate 33 connected to the conductor 37 will become high. Therefore the switch 24 will receive a signal from the logic circuit arrangement 31 which means that the switch is closed so that current will flow through the stator windings with the high current limitation level. In this case the motor current, if permitted to develop freely, would assume unallowable values and thus the current limitation must enter into operation. This is obtained since the voltage across the resistor 29 is continuously supervised by the comparison circuit 56 which switches over when this voltage has assumed a predetermined value whereby the logic circuit arrangement causes the switch 24 to open. This first current pulse moves the rotor from the area of negative torque into the area of positive torque in which the position indicator 22 takes over the control. Thus the following current pulse causes the rotor to turn in the correct direction of rotation.

If the rotor had assumed the position shown in FIG. 1 it would not have been possible to influence the rotor on start at normal current limitation level. However, when voltage is switched on, the same process as described in the foregoing paragraph will be initiated. When the areas of the stator and the rotor poles, respectively, close to the pole surfaces are brought to saturation by the strong motor current, it can be assumed that the pole surface of the rotor will have the appearance indicated by dashed lines. Then the conditions for the previous stable position of the rotor will be changed and the asymmetrical positioning of the rotor thus caused generates a force which tends to turn the rotor so as to assume a position which is symmetric relative to the new pole surface of the rotor. When thereafter under the influence of the current limitation device the motor current and hence the magnetic field decay, the saturation effect will cease at the same time as the rotor has entered an area of positive torque which enables the position indicator 22 to control the following rotor movement in the manner described above so as to drive the motor in normal rotation. Depending on the chosen direction of rotation the first current pulse can move the rotor into a area of negative torque. From this position the motor is driven in normal rotation in the manner described in detail above.

In the embodiment described above analog circuits in combination with traditional logic have been used. It is evident that the invention can be realised also by the use of a micro-computer. This would entirely replace the pulse generator 23, the logic circuit arrangement 31 as well as the delay circuits shown in FIGS. 2 and 3 and connected between the position indicator 22 and the pulse generator 23.

We claim:

1. In a device for controlling a two-pole reluctance motor, having a stator with only two diametrically opposed poles with windings, and a rotor of soft magnetic material having two correspondingly positioned poles, each rotor pole having a first portion with a peripheral extension which coincides with the corresponding extension of the respective stator pole, and an additional portion adjacent the first and stepped radially inwardly and having a pole surface closer to the shaft of the rotor than the first portion, the improvement wherein said device comprises means applying current to said windings which are of insufficient amplitude to saturate said poles when starting with the rotor in a positive torque position, and means to drive the motor by current pulses of a magnitude which in the area of pole overlap saturates at least those portions of the stator and the rotor pole, respectively, situated closest to the pole surfaces when the motor is started with the rotor in a stable position.

2. A device according to claim 1, comprising a position indicator arranged to provide a first indication when the rotor is in areas of positive torque, the device being arranged to drive the motor by the current pulses causing saturation at those positions of the rotor at which the position indicator does not provide said first indication.

3. A device according to claim 2, wherein the pulse repetition rate of the current pulses is of the magnitude 1 Hz.

4. A device according to claim 2 or claim 3, wherein the current pulses to the motor causing saturation are supplied by an electronic switch connecting the motor to a direct-current source, said switch being controlled by a pulse generator connected to deliver control pulses via a logic circuit to said switch in order to close the latter.

5. A device according to claim 4, wherein said logic circuit is connected both to the position indicator and to the pulse generator in order to selectively control the electronic switch in dependence on control pulses from the position indicator and from the pulse generator, the indicator being connected to the pulse generator to activate the latter only on start and only in the absence of said first indication.

6. A device according to claim 5, further comprising a delay circuit connected between the position indicator and the pulse generator whereby during normal operation of the motor the pulse generator remains inactive also during periods in the absence of said first indication.

7. A device according to claim 1, comprising a position indicator arranged to indicate when the rotor is in areas of positive torque, the indicator being arranged to control the motor during normal operation, and a pulse generator arranged to deliver those control signals to the motor which cause the motor to be driven by the current pulses causing saturation, the device further comprising means switching the pulse generator on during a predetermined time after which the position indicator is arranged to take over the control of the motor and the pulse generator is simultaneously inactivated.

8. A device according to claim 7, comprising a delay device is connected between the position indicator and the pulse generator, said delay device transmitting the position indicator signal on start to the pulse generator to inactivate the latter only after the predetermined time has lapsed.

9. A device according to claim 8, wherein the delay device comprises means for delivering a signal to the pulse generator which signal during normal operation of the motor keeps the pulse generator inactive also during periods when the position indicator is inactive.

10. A device according to claim 4 comprising a current limitation means arranged to limit the motor current to a predetermined value applicable during normal operation, the said means via the logic circuit being controllable so that a higher current limitation level, corresponding to the current required for saturation, is allowed when the pulse generator is in operation.

11. A device according to claim 10, wherein said current limitation means includes a sensor for generating a voltage corresponding to the motor current and further comprising a comparison means to which a reference voltage is supplied which via a switch means can be brought to assume two different values corresponding to the normal and the elevated current limitation level, respectively.

12. A motor control system for a two-pole reluctance motor of the type having a stator with two diametrically opposed poles, windings on the stator poles, and a rotor of soft magnetic material having a pair of poles, wherein each rotor pole has a first portion with a circumferential dimension substantially equal to that of the stator poles, and a second portion adjacent the first portion with a circumferential surface stepped radially inwardly to be closer to the axis of the rotor than the first portion, said system comprising sensing means for sensing the relative position of the rotor with respect to the stator, and means responsive to sensing of the position of the rotor at first determined positions during starting for applying pulses to said windings of a magnitude to bring at least those portions of the stator and rotor poles situated closest to the polse surfaces to saturation, and means responsive to the sensing of the position of the rotor at second determined positions during starting for applying pulses to said windings of insufficient amplitude to saturate said stator and rotor poles.

13. The motor control system of claim 12 comprising filter means coupled to said sensing means for inhibiting production of said pulses during continuous rotation of said rotor.

* * * * *